March 3, 1964  H. T. OPENSHAW ETAL  3,123,609
BENZO(a)QUINOLIZINE DERIVATIVES AND METHOD FOR MAKING THEM
Filed Nov. 22, 1960
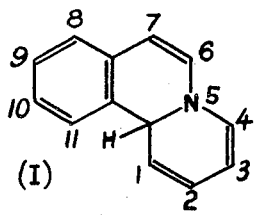
(I)
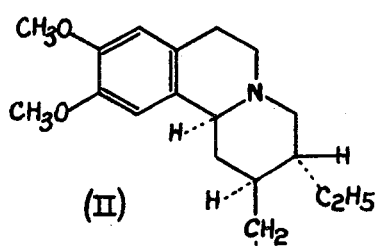
(II)
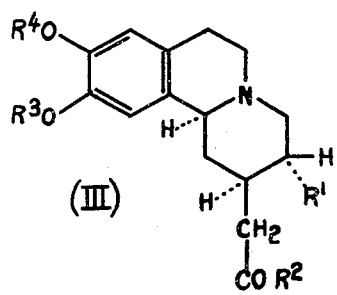
(III)
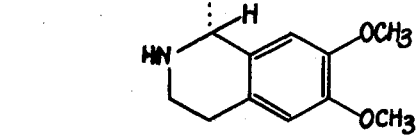
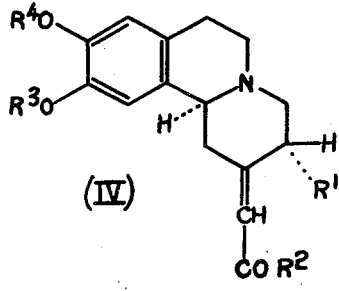
(IV)
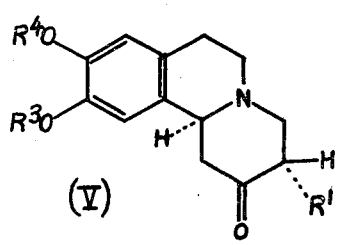
(V)
INVENTORS
Harry Tacon Openshaw
and Norman Whittaker
BY James M. Mason
ATTORNEY 3,123,609
BENZO(a)QUINOLIZINE DERIVATIVES AND
METHOD FOR MAKING THEM
Harry Tacon Openshaw and Norman Whittaker, London, England, assignors to Burroughs Wellcome & Co. (U.S.A.), Inc., Tuckahoe, N.Y., a corporation of New York
Filed Nov. 22, 1960, Ser. No. 71,046
Claims priority, application Great Britain Nov. 24, 1959
8 Claims. (Cl. 260—287)

This invention relates to 11b-benzo(a)quinolizine derivatives and the preparation thereof. The numbering of this ring system is shown in Formula I of the drawings. One of these derivatives, the natural product (—)-emetine shown in Formula II of the drawings, is an established drug in the treatment of amoebiasis. A major difficulty in the synthesis of emetine and its analogues has been the preparation of intermediates having the desired stereochemical configuration.

This invention provides new compounds of Formula IV of the drawings and a method for their preparation. In the drawings, Formulae III, IV and V are to be read as comprising also the mirror images of the structures depicted, and in the formulae $R^1$ is an alkyl group having from 1 to 4 carbon atoms, $R^2$ is a hydroxy or lower alkoxy group, and $R^3$ and $R^4$ are methyl or ethyl groups or together form a methylene group.

In the compounds of Formula IV, the two asymmetric centres at C(3) and C(11b) have the same relative stereochemical configuration as in emetine. The compounds can readily be reduced by the method of copending application No. 71,045 to give in good yield compounds of Formula III of the drawings, which have the desired configuration at C(2) as well as at C(3) and C(11b), and are useful intermediates for the synthesis of emetine and its analogues. (For a generally applicable method, see A. R. Battersby and J. C. Turner, Journal of the Chemical Society, 1960, 717–725.)

When $R^2$ is a lower alkoxy group, the compounds of Formula IV may conveniently be made by the condensation of a correspondingly substituted ketone of Formula V of the drawings with a (lower alkoxycarbonylmethylene)triarylphosphorane. The lower alkoxy group may subsequently be converted by hydrolysis into a hydroxy group. The precise nature of the group $R^2$ is relatively unimportant, because this group is eliminated at a later stage in the synthesis of emetine and its analogues and thus does not appear in the ultimate product.

Although ketones of Formula V contain two asymmetric centres, equilibration is possible through enolisation and only one racemate (the more stable form) is known, having the relative configuration at C(3) and C(11b) shown in Formula V. This racemic ketone can be converted into each of its optical enantiomers, one of which is actually depicted in Formula V. This invention is based on the fortunate circumstance that the compound of Formula IV, which is isolated from the product of condensation of a ketone of Formula V with the phosphorane reagent, retains the desired configuration at C(3) and C(11b). Accordingly, a ketone consisting of the optical enantiomer actually depicted in Formula V gives rise to a compound consisting of the optical enantiomer actually depicted in Formula IV and of the same absolute configuration as emetine. This product may be reduced to give a compound consisting of the enantiomer actually depicted in Formula III, which may then be converted to (—)-emetine or an analogue thereof without the need for optical resolution at a later stage.

This invention in one aspect, therefore, comprises a compound of Formula IV, especially one consisting of the enantiomer actually depicted, and in another aspect comprises the method described above for the preparation of a compound of Formula IV. The invention provides in particular a compound of Formula IV, especially one consisting of the enantiomer actually depicted, wherein $R^1$ is an ethyl group and $R^3$ and $R^4$ are methyl groups, and the method described above for the preparation thereof.

The following examples illustrate the invention. All temperatures are given in degrees Celsius, and the configuration of the compounds is indicated by reference to the appropriate formula of the drawings.

*Example 1*

Racemic 3-ethyl-1,2,3,4,6,7-hexahydro-9,10-dimethoxy-2-oxo-11b-benzo(a)quinolizine (V) (48 g.) and (methoxycarbonylmethylene)triphenylphosphorane (124.9 g.) were dissolved in hot xylene (234 ml.). From the solution 50 ml. of xylene were distilled and the residual solution was then refluxed for 6 hours unde nitrogen. The cooled reaction liquid was diluted with benzene (900 ml.), and extracted with water (900 ml.) containing concentrated hydrochloric acid (35 ml.), and then with water (350 ml.) containing concentrated hydrochloric acid (2.5 ml.). The combined extract was washed with benzene, cooled to 0°, basified with potassium hydroxide, and extracted with chloroform. The chloroform solution was washed with water, dried over sodium sulphate, and evaporated. To the residual hot oil, hot light petroleum (boiling point 80–100°) (2500 ml.) was added gradually, with shaking, and, after cooling, the precipitated excess phosphorane was collected, heated with more light petroleum (boiling point 80–100°) (1000 ml.), cooled and filtered off. The combined filtrate was evaporated, and a solution of the residue in hot methanol (95 ml.) was cooled, seeded, and set aside at 0°, giving 26 g. of racemic 3-ethyl-1,2,3,4,6,7-hexahydro-9,10-dimethoxy-2-methoxycarbonylmethylene - 11b - benzo(a)quinolizine (IV) of melting point 107–110°.

The methanolic liquors were evaporated, the residual oil was boiled with light petroleum (boiling point 60–80°) (500 ml.), cooled, and the light petroleum solution decanted from the resulting gum. Evaporation of the light petroleum solution gave an oil which was dissolved in methanol (20 ml.), seeded, and set aside, yielding 10.69 g. of a mixture of solids. The mixture was digested with hot light petroleum (boiling point 60–80°) (100 ml.), cooled, and filtered from 3.64 g. of unreacted 3-ethyl-1,2,3,4,6,7-hexahydro-9,10-dimethoxy-2 - oxo - 11b-benzo(a)quinolizine (V) of melting point 109–111°. The light petroleum filtrate was evaporated, and the residue crystallised from a few ml. of methanol, yielding an additional 3.02 g. of the required product, of melting point 109–111°.

The combined product was recrystallised from methanol to give colourless prisms (27.07 g.) of pure racemic 3-ethyl-1,2,3,4,6,7-hexahydro-9,10 - dimethoxy - 2 - methoxycarbonylmethylene-11b-benzo(a)quinolizine (IV) of melting point 110–112° (depressed to 86–101° in admixture with starting material of melting point 110–111°).

The spectrum of the compound (compressed in a potassium chloride disc) exhibits strong bands at 1715 cm.$^{-1}$ ($\alpha,\beta$-unsaturated ester) and at 1640 cm.$^{-1}$ (conjugated ethylenic bond).

*Example 2*

A solution of racemic 3-ethyl-1,2,3,4,6,7-hexahydro-9,10 - dimethoxy - 2 - methoxycarbonylmethylene - 11b-benzo(a)quinolizine (IV) (1 g.) in 2N-hydrochloric acid (15 ml.) was heated under reflux for 1 hour. From the cooled solution hydrated crystals of racemic 2-carboxymethylene-3-ethyl-1,2,3,4,6,7 - hexahydro - 9,10 - dimethoxy - 11b - benzo(a)quinolizine (IV) hydrochloride separated. After preliminary drying at 90°, the crystals (1.0 g.) formed a glass at 144–146°. Recrystallisation from water containing a little hydrochloric acid gave colourless flat needles which, after drying, formed a glass at 146–148°.

*Example 3*

When (+)-3-ethyl-1,2,3,4,6,7-hexahydro - 9,10 - dimethoxy - 2 - oxo - 11b - benzo(a)quinolizine (V), $[\alpha]_D^{25}$ +95° (c.=1 in ethanol), was reacted with (methoxycarbonylmethylene)triphenylphosphorane in the manner of Example 1, (−)-3-ethyl-1,2,3,4,6,7-hexahydro-9,10-dimethoxy-2-methoxycarbonylmethylene - 11b - benzo(a)quinolizine (IV), M.P. 105.5–107°, $[\alpha]_D^{23.5}$ −42° (c.=1 in methanol), was obtained.

*Example 4*

When (−)-3-ethyl-1,2,3,4,6,7-hexahydro-9,10-dimethoxy-2-oxo-11b-benzo(a)quinolizine (V), $[\alpha]_D^{25}$ −93.5° (c.=1 in ethanol), was reacted with (methoxycarbonylmethylene)triphenylphosphorane in the manner of Example 1, (+)-3-ethyl-1,2,3,4,6,7-hexahydro-9,10-dimethoxy-2-methoxycarbonylmethylene - 11b - benzo(a)quinolizine (IV), M.P. 105.5–107°, $[\alpha]_D^{23}$ +42° (c.=1 in methanol) was obtained. The asymmetric centres in this optical enantiomer of the unsaturated ester have the same stereochemical configuration as in (−)-emetine, for when the ester is reduced, the product is reacted with homoveratrylamine, and the resulting homoveratrylamide is cyclised with phosphoryl chloride in benzene, (+)-O-methylpsychotrine, identical with the natural alkaloid, is obtained. Reduction of the (+)-O-methylpsychotrine gives the desired (−)-emetine.

We claim:
1. A method for the preparation of compounds of the formula

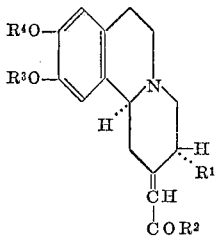

wherein $R^1$ is an alkyl group having from 1 to 4 carbon atoms, $R^2$ is selected from the class consisting of hydroxy and lower alkoxy groups and $R^3$ and $R^4$ are selected from the class consisting of the methyl and ethyl groups and together form a methylene group which comprises reacting at an elevated temperature a compound of the formula

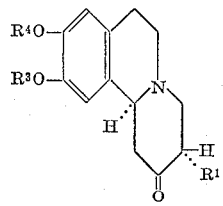

with a lower alkoxycarbonylmethylene triarylphosphorane and recovering the product.

2. A method for the preparation of a 2-(lower alkoxycarbonylmethylene)-3-ethyl - 1,2,3,4,6,7-hexahydro - 9,10-dimethoxy-11b-benzo(a)quinolizine which comprises condensing a 3-ethyl-1,2,3,4,6,7-hexahydro-9,10-dimethoxy-2-oxo-11b-benzo(a)quinolizine with a lower alkoxycarbonylmethylene triarylphosphorane to produce the desired compound.

3. A compound of the formula

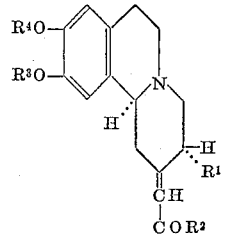

wherein $R^1$ is an alkyl group having from 1 to 4 carbon atoms, $R^2$ is selected from the class consisting of hydroxy and lower alkoxy groups and $R^3$ and $R^4$ are selected from the class consisting of the methyl and ethyl groups and together form a methylene group.

4. 3-ethyl-1,2,3,4,6,7 - hexahydro - 9,10 - dimethoxy-2-methoxycarbonylmethylene-11b-benzo(a)quinolizine.

5. A 2 - (lower alkoxycarbonylmethylene) - 3 - ethyl-1,2,3,4,6,7-hexahydro - 9,10 - dimethoxy - 11b - benzo(a)quinolizine.

6. 2 - carboxymethylene - 3 - ethyl - 1,2,3,4,6,7 - hexahydro-9,10-dimethoxy-11b-benzo(a)quinolizine.

7. A (+)-2-(lower alkoxycarbonylmethylene) - 3-ethyl-1,2,3,4,6,7-hexahydro-9,10 - dimethoxy - 11b-benzo(a)quinolizine substantially free from its (−)-enantiomer.

8. (+)-3-ethyl - 1,2,3,4,6,7 - hexahydro - 9,10 - dimethoxy-2-methoxycarbonylmethylene - 11b - benzo(a)quinolizine substantially free from its (−)-enantiomer.

References Cited in the file of this patent
FOREIGN PATENTS
337,846     Switzerland _____ June 15, 1959

OTHER REFERENCES

Battersby et al.: Helvetica Chimica Acta, vol. 42, pages 1515–1518 (1959).
Battersby et al.: J. Chem. Soc., pages 717–720 (1960).
Battersby et al.: Chem. and Industry, pages 982–983 (1957).
Brossi et al.: Helvetica Chimica Acta, vol. 42, pages 772–786 (1959).